United States Patent
Arai et al.

(10) Patent No.: US 6,704,720 B2
(45) Date of Patent: Mar. 9, 2004

(54) SYSTEM AND METHOD FOR USER INPUT SEARCH CONDITIONS TO RETRIEVE INTEGRATED SUBSTANCES PHYSICAL PROPERTY DATA, AND RETRIEVE SYSTEMATICALLY CLOSE SUBSTANCES TO SPECIFIED RECORDS BASED UPON DETERMINED SYSTEMATIC DEGREES OF SIMILARITY BETWEEN THE SUBSTANCES, FROM PLURALITY OF TARGET DATABASES

(75) Inventors: Kazufumi Arai, Kawasaki (JP); Tatsuhiko Nonomura, Kawasaki (JP); Makoto Ogura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/087,499

(22) Filed: May 29, 1998

(65) Prior Publication Data

US 2001/0013028 A1 Aug. 9, 2001

(30) Foreign Application Priority Data

Dec. 12, 1997 (JP) ............................................. 9-342539

(51) Int. Cl.$^7$ ............................................. G06F 17/30
(52) U.S. Cl. ................ 707/3; 707/5; 707/7; 707/104.1; 345/968; 700/266; 702/22; 702/30; 436/43
(58) Field of Search .................... 707/1–10, 100–104.1, 707/200–206; 345/804, 968; 382/113, 224; 436/63, 43; 702/20, 27, 31–32, 19, 22, 30; 700/266–269

(56) References Cited

U.S. PATENT DOCUMENTS

| | | | | |
|---|---|---|---|---|
| 5,121,494 A | * | 6/1992 | Dias et al. | 395/600 |
| 5,263,159 A | * | 11/1993 | Mitsui | 707/5 |
| 5,321,804 A | * | 6/1994 | Kusaba et al. | 345/784 |
| 5,717,915 A | * | 2/1998 | Stolfo et al. | 395/605 |
| 5,901,069 A | * | 5/1999 | Agrafiotis et al. | 364/528.03 |
| 5,915,248 A | * | 6/1999 | Kinoshita et al. | 707/1 |

(List continued on next page.)

FOREIGN PATENT DOCUMENTS

WO      WO 00/03336      *   1/2000      ..................... 17/30

OTHER PUBLICATIONS

Paulsell et al, Transact–SQL User's Guide for SYBASE SQL Server, Sybase Document ID 32300–01–0491, last revised Oct. 15, 1992, pp. 2–1 thru 2–14, 2–19 thru 2–30, 3–1 thru 3–20, 4–7 thru 4–14, 4–19 thru 4–22, 6–1 thru 6–12, 7–1 thru 7–8.*

Simpson, Understanding dBASE IV 1.1, 2d edition, Sybex, Inc., pp. 420–445, 1990.*

Jean Thioulouse, et al., ADE–4: a multivariate analysis and graphical display software, Statistics and Computing Aug. 1996, pp 75–83.*

*Primary Examiner*—Srirama Channavajjala
(74) *Attorney, Agent, or Firm*—Staas & Halsey LLP

(57) ABSTRACT

A system for retrieving information from a plurality of databases, even when the content of the databases is different. A target database-extracting device extracts databases containing data that has been sought to retrieve. An integrated information retrieval device integrates data from the extracted databases and retrieves records from the databases matching retrieval conditions. A systematic retrieval device retrieves other record from the extracted databases that are systematically close to the records designated to be retrieved. The systematic closeness between records is calculated as a function of the degree of similarity between information in the records. Records are calculated A retrieval result display device displays the results of the retrieval by the integrated retrieval device and by the systematic retrieval device.

11 Claims, 20 Drawing Sheets

U.S. PATENT DOCUMENTS

| | | | |
|---|---|---|---|
| 5,926,808 A | * 7/1999 | Evans et al. | 707/3 |
| 5,926,809 A | * 7/1999 | Szalwinski | 707/3 |
| 5,933,837 A | * 8/1999 | Kung | 707/201 |
| 5,950,192 A | * 9/1999 | Moore et al. | 702/27 |
| 5,974,407 A | * 10/1999 | Sacks | 707/2 |
| 5,978,804 A | * 11/1999 | Dietzman | 707/10 |
| 5,983,215 A | * 11/1999 | Ross et al. | 707/2 |
| 5,987,452 A | * 11/1999 | Kung | 707/4 |
| 5,987,453 A | * 11/1999 | Krishna et al. | 707/4 |
| 6,199,017 B1 | * 3/2001 | Tomonaga et al. | 700/266 |
| 6,323,852 B1 | * 11/2001 | Blower et al. | 345/804 |
| 6,370,479 B1 | * 4/2002 | Tomikawa et al. | 436/63 |

* cited by examiner

| ITEMS OF CLASSIFICATION | | | CLASSIFIED SUBSTANCES |
|---|---|---|---|
| 1 CLASSIFICATION ACCORDING TO GENERATION | NATURAL POLYMER | | A, C |
| | MODIFIED NATURAL POLYMER | | B |
| | SYNTHETIC HIGH POLYMER | | D, E, F |
| 2 CLASSIFICATION ACCORDING TO STRUCTURE | LINEAR POLYMER | | C, F |
| | BRANCHED POLYMER | | A, B |
| | NETWORK POLYMER (3-DIMENSIONAL) | | D, E |
| 3 CLASSIFICATION ACCORDING TO MONOMER COMPOSITION AND MANNER OF COMBINATION OF MONOMERS | HOMOPOLYMER | | A, B |
| | COPOLYMER | RANDOM COPOLYMER | C, F |
| | | ALTERNATING COPOLYMER | |
| | | GRAFT COPOLYMER | D |
| | | BLOCK COPOLYMER | E |
| 4 CLASSIFICATION ACCORDING TO SYNTHESIS METHOD | SUCCESSIVE POLYMERIZATION | POLYADDITION | A |
| | | CHAIN POLYMERIZATION | B, C |
| | POLYCONDENSATION | ADDITION POLYMERIZATION | RADICAL POLYMERIZATION | D |
| | | | ION POLYMERIZATION | E |
| | | RING OPENING POLYMERIZATION | RADICAL POLYMERIZATION | F |
| | | | ION POLYMERIZATION | |

FIG.2

| NAME OF ITEM | NAME OF DATA STORAGE TABLE |
|---|---|
|  |  |
|  |  |
|  |  |

| TOTAL ID | NATURAL POLYMER | MODIFIED POLYMER | ... | ALTERNATING COPOLYMER |
|---|---|---|---|---|
|  |  |  |  |  |
|  |  |  |  |  |
|  |  |  |  |  |
|  |  |  |  |  |

RETRIEVAL CONDITIONS: 1.2 < SPECIFIC GRAVITY (SMALL) < 1.7
AND/OR 950 < TENSILE RUPTURE (SMALL) < 1300

DB_A  _111a_

| ID | NAME | SPECIFIC GRAVITY (SMALL) | TENSILE RUPTURE (SMALL) | BENDING STRENGTH (SMALL) | BENDING MODULUS (SMALL) |
|---|---|---|---|---|---|
| 1 | POLYETHYLENE TEREPHTHALATE | 1.14 | | 1310 | 46 |
| 2 | POLYAMIDE 6 | | 1000 | 1600 | 60 |
| 3 | POLYBUTYLENE TEREPHTHALATE | 1.64 | | 1900 | 120 |
| 4 | POLYPROPYLENE | | 330 | 500 | 30 |
| 5 | METHACRYLATE RESIN | | 750 | 1200 | 35 |

RETRIEVAL RESULTS: AND 0 HIT, OR 1 HIT

DB_B  _112a_

| ID | NAME | SPECIFIC GRAVITY (SMALL) | TENSILE RUPTURE (SMALL) | IZOD IMPACT STRENGTH (SMALL) | DEFLECTION TEMPERATURE UNDER LOAD 18K (LARGE) | ELECTRIC LINKAGE TEMPERATURE |
|---|---|---|---|---|---|---|
| 1 | POLYETHYLENE TEREPHTHALATE | | 930 | 6 | 205 | 120 |
| 2 | POLYAMIDE 6 | 1.39 | | 4 | 130 | 90 |
| 3 | POLYBUTYLENE TEREPHTHALATE | | 1200 | 6 | 200 | 120 |
| 4 | POLYPROPYLENE | | | 4 | 100 | 105 |
| 5 | METHACRYLATE RESIN | 1.19 | | 1 | 97 | 50 |

RETRIEVAL RESULTS: AND 0 HIT, OR 1 HIT

DB_C  _113a_

| ID | NAME | SPECIFIC GRAVITY (SMALL) | TENSILE RUPTURE (LARGE) | BREAKING EXTENSION (SMALL) | BREAKING EXTENSION (LARGE) |
|---|---|---|---|---|---|
| 1 | POLYETHYLENE TEREPHTHALATE | 1.14 | 930 | 5.9 | 5.9 |
| 2 | POLYAMIDE 6 | | 1000 | 3 | 3 |
| 3 | POLYBUTYLENE TEREPHTHALATE | | 1200 | 3 | 3 |
| 4 | POLYPROPYLENE | | 330 | 10 | 10 |
| 5 | METHACRYLATE RESIN | 1.19 | 750 | 6 | 6 |

RETRIEVAL RESULTS: AND 0 HIT, OR 2 HITS

RETRIEVAL CONDITIONS: 1.2 < SPECIFIC GRAVITY (SMALL) < 1.7
AND/OR 950 < TENSILE RUPTURE (SMALL) < 1300

INTEGRATED DB                                                                    103a

| ID | NAME | DB_A SPECIFIC GRAVITY (SMALL) | DB_A TENSILE RUPTURE (SMALL) | DB_A BENDING STRENGTH (SMALL) | DB_A BENDING MODULUS (SMALL) |
|----|------|-------------------------------|------------------------------|-------------------------------|------------------------------|
| 1 | POLYETHYLENE TEREPHTHALATE | 1.14 | | 1310 | 46 |
| 2 | POLYAMIDE 6 | | 1000 | 1600 | 60 |
| 3 | POLYBUTYLENE TEREPHTHALATE | 1.64 | | 1900 | 120 |
| 4 | POLYPROPYLENE | | 330 | 500 | 30 |
| 5 | METHACRYLATE RESIN | | 750 | 1200 | 35 |

| DB_B SPECIFIC GRAVITY (SMALL) | DB_B TENSILE RUPTURE (SMALL) | DB_B IZOD IMPACT STRENGTH (SMALL) | DB_B DEFLECTION TEMPERATURE UNDER LOAD 18K (LARGE) | DB_B ELECTRIC LINKAGE TEMPERATURE |
|---|---|---|---|---|
| | 930 | 6 | 205 | 120 |
| 1.39 | | 4 | 130 | 90 |
| | 1200 | 6 | 200 | 120 |
| | | 4 | 100 | 105 |
| 1.19 | | 1 | 97 | 50 |

| DB_C SPECIFIC GRAVITY (SMALL) | DB_C TENSILE RUPTURE (SMALL) | DB_C TENSILE RUPTURE (LARGE) | DB_C BREAKING EXTENSION (SMALL) | DB_C BREAKING EXTENSION (LARGE) |
|---|---|---|---|---|
| 1.14 | 930 | 930 | 5.9 | 5.9 |
| | 1000 | 650 | 3 | 3 |
| | 1200 | 1200 | 3 | 3 |
| | 330 | 330 | 10 | 10 |
| 1.19 | 750 | 750 | 6 | 6 |

RETRIEVAL RESULTS: AND 2 HITS, OR 2 HITS

| | PERMITTIVITY | ELECTRIC CONDUCTIVITY | REFRACTIVE INDEX | TRANS-PARENCY | PERME-ABILITY |
|---|---|---|---|---|---|
| SUBSTANCE A | 3 | | 4 | 3 | |
| SUBSTANCE B | | 4 | | 4 | 4 |
| SUBSTANCE C | | 5 | | 6 | 6 |
| SUBSTANCE D | 6 | | | | 7 |
| SUBSTANCE E | 7 | 9 | 12 | | |
| SUBSTANCE F | 12 | 10 | 14 | | |
| | | | | | |
| SUBSTANCE Z | 10 | 12 | | 8 | |

4 < PERMITTIVITY < 12

[S102]

| | PERMITTIVITY | ELECTRIC CONDUCTIVITY | REFRACTIVE INDEX | TRANS-PARENCY | PERME-ABILITY |
|---|---|---|---|---|---|
| SUBSTANCE D | 6 | | | | |
| SUBSTANCE E | 7 | 9 | 12 | | |
| SUBSTANCE Z | 10 | 12 | | 8 | |

SYSTEMATIC INFORMATION RETRIEVAL FOR SUBSTANCE D

[S103]

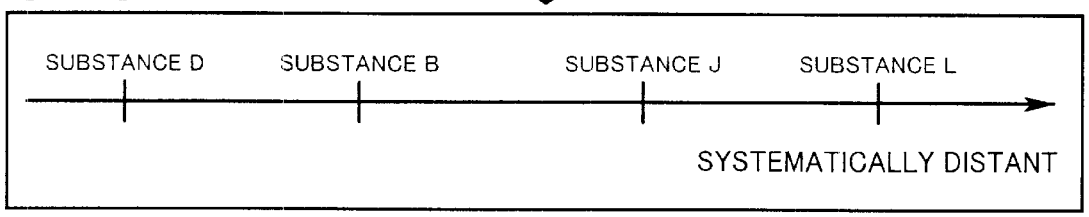

SYSTEMATICALLY DISTANT

[S104]

| | PERMITTIVITY | ELECTRIC CONDUCTIVITY | REFRACTIVE INDEX | TRANS-PARENCY | PERME-ABILITY |
|---|---|---|---|---|---|
| SUBSTANCE B | | 4 | | 4 | 4 |
| SUBSTANCE D | 6 | | | | |
| SUBSTANCE E | 7 | 9 | 12 | | |
| SUBSTANCE Z | 10 | 12 | | 8 | |

FIG.18

SYSTEM AND METHOD FOR USER INPUT SEARCH CONDITIONS TO RETRIEVE INTEGRATED SUBSTANCES PHYSICAL PROPERTY DATA, AND RETRIEVE SYSTEMATICALLY CLOSE SUBSTANCES TO SPECIFIED RECORDS BASED UPON DETERMINED SYSTEMATIC DEGREES OF SIMILARITY BETWEEN THE SUBSTANCES, FROM PLURALITY OF TARGET DATABASES

BACKGROUND OF THE INVENTION

1. Field of the Invention

The present invention relates to a database retrieval system and a computer-readable storage medium that stores a program for database retrieval, and more particularly to a database retrieval system that retrieves information from a plurality of databases and a computer-readable storage medium that stores a program for retrieving information from the databases.

2. Description of the Related Art

Many researchers of natural science usually develop their study with reference to existing data or data accumulated heretofore. Especially, in the field of chemistry, reference is often made to physical properties of an immense number of substances to create a compound having new properties. To carry out efficient research in the development of a new material, databases storing information concerning physical properties of substances are frequently used.

These databases include in-house databases developed by researchers or users of research laboratories, and databases provided by database vendors. These databases differ in contents of data stored therein. For instance, there can be a case where one database contains only values of electric conductivity and refractive indexes of substances. If the user wishes to obtain information concerning transparency and permittivity of the substances, he has to retrieve information from another database. Therefore, it is necessary for one research organization to use several databases. Further, the environment required for each search and retrieval varies from database to database, and hence the user utilizing a plurality of databases is required to selectively set up a suitable environment database by database.

To carry out retrieval of information from the different databases, query expressions are prepared for the respective databases and the retrieval of information is carried out using these expressions. Results of the retrievals obtained from all of the required databases are manually arranged in order to obtain a comprehensive listing of results of the research being performed.

However, it is an extremely time consuming operation for the user to prepare query expressions and arrange the results of the retrieval in order. Moreover, databases may not store a comprehensive set of the values of physical properties required by the user. This presents the following problems for the user:

First, when data stored on several databases is narrowed down by a query expression to obtain necessary information, data that ought to match the query expression if the data were stored in a single database can be left out of the results of the query. For example, one database contains data concerning electric conductivity and refractive indexes of substances while another database contains data concerning refractive indexes and thermal conductivity of substances. When the search is carried out by the query expression, "electric conductivity" AND (a logical multiplication) "thermal conductivity," the query will return no data because neither database contains information fulfilling both retrieval conditions. Therefore, it is impossible to obtain information fulfilling both of the two conditions of "electric conductivity" and "thermal conductivity" from the separate databases.

Second, when the database does not store the specific data needed by the user, there is no available means to predict values for the data. For example, if data for electric conductivity of a substance is missing, it is possible to predict the electric conductivity of the substance using electric conductivity of another substance having similar physical properties. However, information documenting the similarities between the substances that can be used in making this kind of prediction is so diverse that it is difficult for individual users to determine the required similarities.

SUMMARY OF THE INVENTION

It is a first object of the invention to provide a database retrieval system that solves the problems encountered when a plurality of databases are used in combination.

It is a second object of the invention to provide a database retrieval system that is capable of providing data for reference such that missing data can be predicted.

It is a third object of the invention to provide a computer-readable storage medium storing a database retrieval program that is capable of solving the problems encountered when a plurality of databases are used in combination.

It is a fourth object of the invention to provide a computer-readable storage medium storing a database retrieval program that is capable of providing data for reference such that missing data can be predicted.

To attain the first object, according to a first aspect of the invention, there is provided a database retrieval system for carrying out information retrieval from a plurality of databases, comprising integrated information retrieval means responsive to retrieval conditions input, for integrating data separately added to identical records in a plurality of databases and retrieving records matching the retrieval conditions based on integrated information of the data.

To attain the second object, according to a second aspect of the invention, there is provided a database retrieval system for carrying out information retrieval from a database, comprising systematic information retrieval means responsive to a systematic information retrieval command in which a particular record is designated, for retrieving, from the database, other records systematically close to the designated particular record.

To attain the third object, according to a third aspect of the invention, there is provided a computer-readable storage medium storing a program for retrieving information from a plurality of databases, the program controlling a computer to function as integrated information retrieval means responsive to retrieval conditions input, for integrating data separately added to identical records in a plurality of databases and retrieving records matching the retrieval conditions based on integrated information of the data.

To attain the fourth object, according to a fourth aspect of the invention, there is provided a computer-readable storage medium storing a program for retrieving information from a database, the program controlling a computer to function as systematic information retrieval means responsive to a systematic information retrieval command in which a particular record is designated, for retrieving, from the database, other records systematically close to the designated particular record.

The above and other objects, features and advantages of the present invention will become apparent from the following description when taken in conjunction with the accompanying drawings which illustrate a preferred embodiment of the present invention by way of example.

BRIEF DESCRIPTION OF THE DRAWINGS

FIG. 2 is a diagram showing a classified table of substances;

FIG. 6 is a diagram showing an item-table lookup table;

FIG. 10 is a diagram showing a substance classification table;

FIG. 16 is a diagram showing an example of information retrieval separately carried out on a plurality of databases storing data of physical properties of substances;

FIG. 17 is a diagram showing an example of information retrieval carried out on the databases storing data of physical properties in an integrating fashion;

FIG. 18 is a first diagram which is useful in explaining the advantage of the systematic information retrieval;

DESCRIPTION OF THE PREFERRED EMBODIMENTS

The invention will now be described in detail with reference to drawings showing a preferred embodiment thereof.

Figure 1:
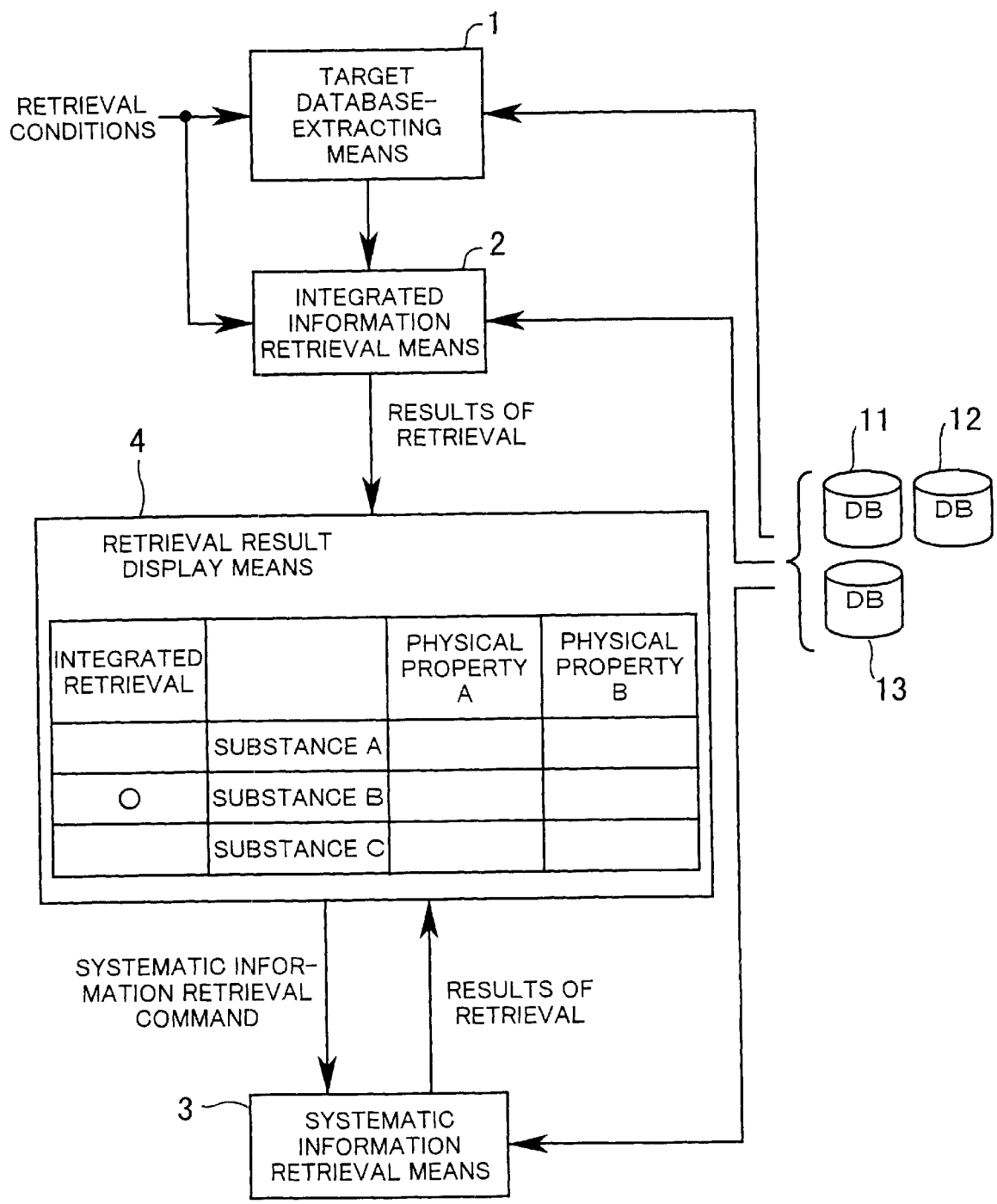
FIG. 1 is a diagram showing the principle of a database retrieval system according to the invention.

Referring first to FIG. 1, there is illustrated a principle of a database retrieval system according to the invention, which retrieves information from a plurality of databases 11 to 13 storing different contents of data.

Target database-extracting means 1 is responsive to retrieval conditions input, for extracting databases containing data that are to be narrowed down for information retrieval. For instance, assuming that the databases 11 to 13 store data of values of various physical properties of substances, if a retrieval condition of "3<electric conductivity<6" is input, the target database-extracting means 1 extracts only databases storing data of electric conductivity to retrieve information therefrom. This makes it possible to carry out efficient retrieval of information without wasteful processing operations.

Integrated information retrieval means 2 integrates the data of the databases 11 to 13, and retrieves records matching retrieval conditions from the databases based on the integrated data.

Systematic information retrieval means 3 retrieves, in response to a systematic information retrieval command in which a specific record is designated, another record systematically close to the designated record.

Retrieval result display means 4 displays results of an information retrieval carried out by the integrated information retrieval means 2 in response to inputting of retrieval conditions, and results of a retrieval carried out by the systematic information retrieval means 3 in response to a systematic information retrieval command, on a screen of a display device. It should be noted that in this screen there is provided an area for selecting a record to be retrieved, and a systematic information retrieval command designating the record selected from this screen can be input to the systematic information retrieval means 3.

When the user inputs retrieval conditions to the database retrieval system, the target database-extracting means 1 extracts target databases to be searched for information. Then, the integrated information retrieval means 2 integrates data of the target databases, and retrieves records matching the input retrieval conditions (e.g. substances having predetermined values of physical properties). Results of the retrieval are displayed on the screen of the display device by the retrieval result display means 4.

This enables the user to retrieve information from all the databases to be searched, by inputting a single set of retrieval conditions. What is more, the retrieval process is carried out using the integrated data of the databases, it is possible to retrieve data which can not be retrieved if the databases are searched individually or separately.

If a retrieved record has missing data, and the user requires the missing data, inputting is carried out to execute a systematic information retrieval by selecting the record. In response to the input, the systematic information retrieval means 3 retrieves a record systematically close to the designated record. Results of the retrieval are displayed on the screen of the display device by the retrieval result display means 4.

Thus, information or data of a record systematically close to the required data of the designated record is displayed for reference, which enables the user to view data in the databases that is systematically close to the information sought to be retrieved.

It should be noted that systematic closeness between records can be represented by a degree of similarity between information of the records. The method of determining a systematic similarity will be explained by taking polymers as an example.

To determine a systematic similarity, first, a degree of similarity is calculated by comparing substances with each other. In the case of polymers, substances can be classified according to a plurality of methods. Therefore, if substances are classified into an identical class by the same classifying method, they are determined to have a similarity. More specifically, the degrees of similarity are expressed in numerical values by using a classified table of substances.

FIG. 2 shows a classified table of substances. This table contains items of classification and classified substances corresponding to the respective classified items.

In the illustrated example, the substances are classified by the four classifying methods; "classification according to generation," "classification according to structure," "classification according to monomer composition and a manner of combination of monomers" and "classification according to synthesis method." Some classifying methods classify the substances in a hierarchical manner. For example, a class "copolymer" in the "classification according to manners and a manner of combination of monomers," is further divided into subclasses of "random copolymer," "alternating copolymer," "graft copolymer" and "block copolymer."

Now, the degrees of the similarity of substances to a substance A will be considered. When attention is paid to "classification according to generation," the substance A and a substance C belong to the same class, and hence have a similarity. Therefore, the similarity between the substance A and the substance C gains one point. Then, when the attention is paid to "classification according to structure," the substance A and the substance B belong to the same class, i.e. has a similarity. Therefore, the similarity between the substance A and the substance B gains one point. Further, when the attention is paid to "classification according to monomer composition and a manner of combination of monomers," the substance A and the substance B belong to the same class, i.e. has a similarity. Therefore, the similarity between the substance A and the substance B gains one point. As a result, the similarity between the substance A and the substance B has gained two points. The "classification according to synthesis method" gives no substances belonging to the same class. Therefore, the similarity between the substance A and the substance B has two points, and the substance A and the substance C has one point, so that the substance B is the most similar to the substance A of all the substances.

Thus, points of similarity between every possible combination or pair of all substances are determined. Now, let it be assumed that the similarity between two substances (substance i and substance j) is equal to $e_{ij}$.

Next, the multivariate analysis is applied to the above similarity and projects results of the analysis onto a coordinate system to thereby rank the substances in the order of similarity. More specifically, all the substances are given respective positions in one-dimensional system whereby the similarities between substances are represented by distances between the positions (coordinates) of the substances on the one-dimensional coordinate system. The relationship between the positions of the substance i (coordinate value $\alpha_i$) and the substance j (coordinate value $\alpha_j$) on the one-dimensional coordinate system is expressed by a numerical value obtained by the following expression:

$$-(\alpha_i - \alpha_j)^2 \qquad (1)$$

The numerical value obtained by the expression (1) is called "similarity in terms of distance."

To obtain the coordinate value $\alpha_i$, it is only required to increase the correlation between the $e_{ij}$ and the expression (1) to a highest degree. For simplicity, the following description is made on a case where four substances are ranked in the order of similarity.

First, from the definition of a coefficient of correlation, the coordinate values $\alpha_1$, $\alpha_2$, $\alpha_3$, and $\alpha_4$ are determined such that the inner product Q of vectors of the similarity $e_{ij}$ ($e_{12}$, $e_{13}$, $e_{14}$, $e_{23}$, $e_{24}$, $e_{34}$) and vectors of similarity in terms of distance becomes the maximum:

$$Q = -e_{12}(\alpha_1-\alpha_2)^2 - e_{13}(\alpha_1-\alpha_3)^2 - e_{14}(\alpha_1-\alpha_4)^2 - e_{23}(\alpha_2-\alpha_3)^2 - e_{24}(\alpha_2-\alpha_4)^2 - e_{34}(\alpha_3-\alpha_4)^2 \qquad (2)$$

However, if each $\alpha_i$ is multiplied by k, the value Q becomes multiplied by $k^2$, which means that the value of Q can be increased to any larger value. Therefore, the following conditions are given:

$$\alpha_1^2 + \alpha_2^2 + \alpha_3^2 + \alpha_4^2 = 1 \qquad (3)$$

This converts the above equation into the constrained extreme value problem to which the method of Lagrange's multiplier can be applied.

$$F = -e_{12}(\alpha_1 - \alpha_2)^2 - e_{13}(\alpha_1 - \alpha_3)^2 - e_{14}(\alpha_1 - \alpha_4)^2 - \qquad (4)$$
$$e_{23}(\alpha_2 - \alpha_3)^2 - e_{24}(\alpha_2 - \alpha_4)^2 - e_{34}(\alpha_3 - \alpha_4)^2 -$$
$$\lambda(\alpha_1^2 + \alpha_2^2 + \alpha_3^2 + \alpha_4^2 - 1)$$

In the above equation, F is partially differentiated by $\alpha_1$, $\alpha_2$, $\alpha_3$, and $\alpha_4$ and the results are set to 0 ($\lambda$ represents an eigenvalue), whereby the following equations (5) to (8) can be obtained:

$$\frac{\partial F}{\partial \alpha_1} = 2\{-e_{12}(\alpha_1 - \alpha_2) - e_{13}(\alpha_1 - \alpha_3) - e_{14}(\alpha_1 - \alpha_4) - \lambda\alpha_1\} = 0 \qquad (5)$$

$$\frac{\partial F}{\partial \alpha_2} = 2\{e_{12}(\alpha_1 - \alpha_2) - e_{23}(\alpha_2 - \alpha_3) - e_{24}(\alpha_2 - \alpha_4) - \lambda\alpha_2\} = 0 \qquad (6)$$

$$\frac{\partial F}{\partial \alpha_3} = 2\{e_{13}(\alpha_1 - \alpha_3) + e_{23}(\alpha_2 - \alpha_3) - e_{34}(\alpha_3 - \alpha_4) - \lambda\alpha_3\} = 0 \qquad (7)$$

$$\frac{\partial F}{\partial \alpha_4} = 2\{e_{14}(\alpha_1 - \alpha_4) + e_{24}(\alpha_2 - \alpha_4) + e_{34}(\alpha_3 - \alpha_4) - \lambda\alpha_4\} = 0 \qquad (8)$$

When these equations are rearranged by using the coordinate values $\alpha_1$, $\alpha_2$, $\alpha_3$, and $\alpha_4$, the following simultaneous equations can be obtained:

$$\begin{cases} (-e_{12} - e_{13} - e_{14} - \lambda)\alpha_1 + e_{12}\alpha_2 + e_{13}\alpha_3 + e_{14}\alpha_4 = 0 \\ e_{12}\alpha_1 + (-e_{12} - e_{23} - e_{24} - \lambda)\alpha_2 + e_{23}\alpha_3 + e_{24}\alpha_4 = 0 \\ e_{13}\alpha_1 + e_{23}\alpha_2 + (-e_{13} - e_{23} - e_{24} - \lambda)\alpha_3 + e_{34}\alpha_4 = 0 \\ e_{14}\alpha_1 + e_{24}\alpha_2 + e_{34}\alpha_3 + (-e_{14} - e_{24} - e_{34} - \lambda)\alpha_4 = 0 \end{cases} \qquad (9)$$

The simultaneous equations (9) can be expressed in the following matrix:

$$\begin{bmatrix} \beta_1 & e_{12} & e_{13} & e_{14} \\ e_{12} & \beta_2 & e_{23} & e_{24} \\ e_{13} & e_{23} & \beta_3 & e_{34} \\ e_{14} & e_{24} & e_{34} & \beta_4 \end{bmatrix} \begin{bmatrix} \alpha_1 \\ \alpha_2 \\ \alpha_3 \\ \alpha_4 \end{bmatrix} = \begin{bmatrix} 0 \\ 0 \\ 0 \\ 0 \end{bmatrix} \begin{pmatrix} \beta_1 = -e_{12} - e_{13} - e_{14} - \lambda \\ \beta_2 = -e_{12} - e_{23} - e_{24} - \lambda \\ \beta_3 = -e_{13} - e_{23} - e_{34} - \lambda \\ \beta_4 = -e_{14} - e_{24} - e_{34} - \lambda \end{pmatrix} \qquad (10)$$

Therefore, the above extreme value results in an eigenvalue problem of a symmetric matrix, from which the eigenvalue $\lambda$ can be determined. In this case, there are obtained a plurality of values of the eigenvalue $\lambda$.

Now, from the equations (4) to (8), there is obtained the following equation:

$$F = \lambda \qquad (11)$$

From this, it is understood that the maximum value of F, i.e. the maximum value of the inner product Q is given by the eigenvalue $\lambda$. Therefore, the maximum eigenvalue $\lambda$ is selected, and the coordinate values $\alpha_1$, $\alpha_2$, $\alpha_3$, and $\alpha_4$ are determined from the selected maximum eigenvalue $\lambda$. This value represents a coordinate value of each substance projected onto the coordinate system.

If all the substances are projected onto one-dimensional coordinate system, to find a substance which is systematically close to one substance, it is only required to select a substance which is adjacent to the one substance along the coordinate axis.

Now, the invention will be described in further detail based on an embodiment in which it is applied to a client/server system.

Figure 3:
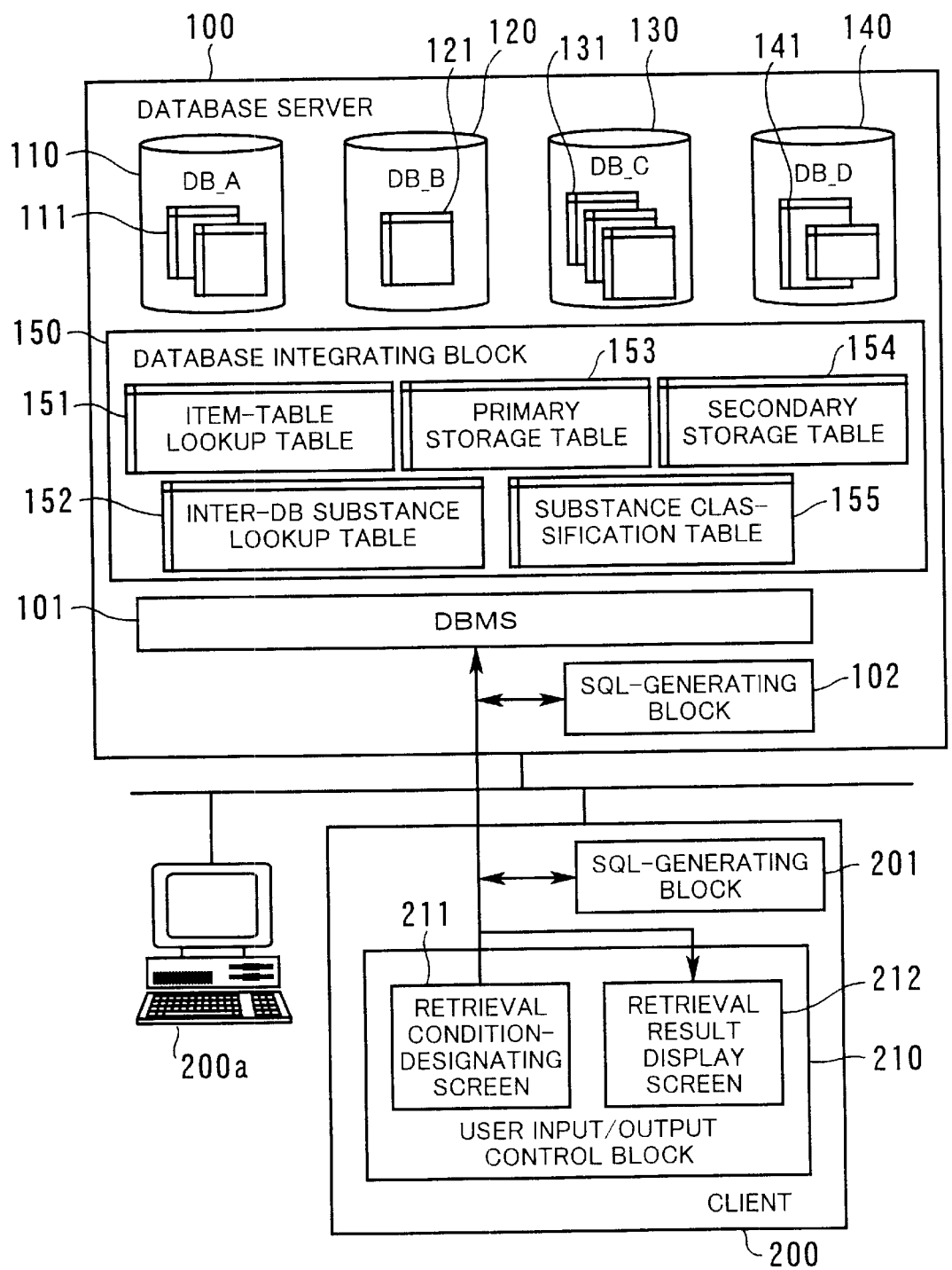
FIG. 3 is a diagram showing the whole arrangement of the database retrieval system according to an embodiment of the invention.

Referring to FIG. 3, there is shown a whole arrangement of the database retrieval system according to the embodiment, which includes a database server 100, a client 200, and a client 200a all connected via a network.

The database server 100 contains a plurality of databases (DBs) 110, 120, 130 and 140. The databases (DBs) 110, 120, 130 and 140 have respective data storage tables 111, 121, 131 and 141. The databases 110, 120, 130, and 140 are named "DB_A," "DB_B," "DB_C," and "DB_D," respectively.

A database integrating block 150 carries out a process for causing the databases to function as if they were a single database (DB). That is, the database integrating block 150 can retrieve information from the databases (DBs) 110, 120, 130 and 140 in an integrating fashion by using a plurality of database management tables. The database management tables include an item-table lookup table 151, an inter-DB substance lookup table 152, a primary storage table 153, a secondary storage table 154, and a substance classification table 155.

A database management system (DBMS) 101 accesses the database (DBs) 110, 120, 130, and 140 according to a query in the structured query language (SQL). A SQL-generating block 102 generates a SQL command or query according to a request by the database integrating block 150.

The client 200 has a user input/output control block 210 that displays a retrieval condition-designating screen 211 or a retrieval result display screen 212 on the display device, and analyzes information provided by an input device based on the contents of any of the screens to generate a request to the database server 100 based on the analyzed information. The retrieval condition-designating screen 211 enables the user to input a query expression or retrieval command. The retrieval result display screen 212 displays results of an integrated retrieval, and is used for inputting a command for a systematic information retrieval when the user intends to carry out the systematic information retrieval. The client 200 is also provided with an SQL-generating block 201 that generates a SQL command or query as required.

Figure 4:
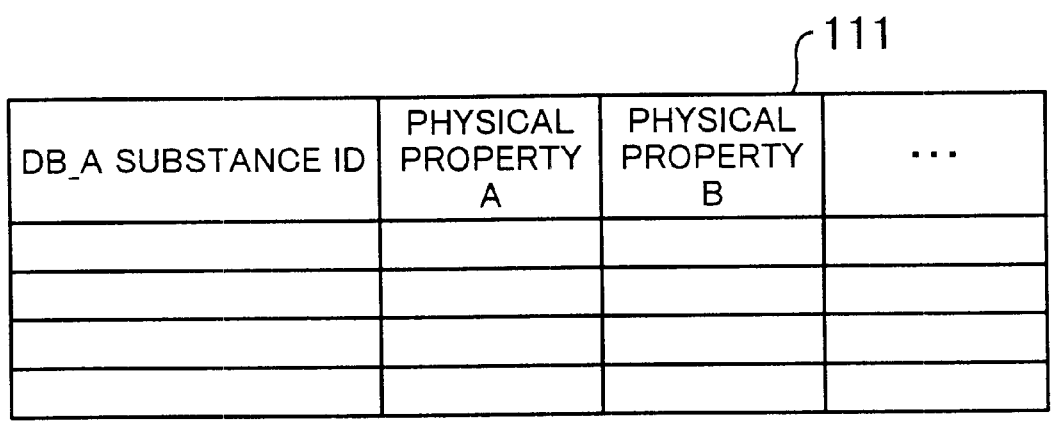
FIG. 4 is a diagram showing a data storage table 111.

FIG. 4 shows a data storage table 111. The data storage table 111 contains values of physical properties of substances, which are registered therein under respective items indicative of the physical properties ("physical property A," "physical property B," , , , ) in a manner correlated to substance IDs in the database DB_A. The substance IDs of the database DB_A are identifiers uniquely assigned to the respective substances, and enables the substances to be discriminated from each other only within the database DB_A 110.

Figure 5:
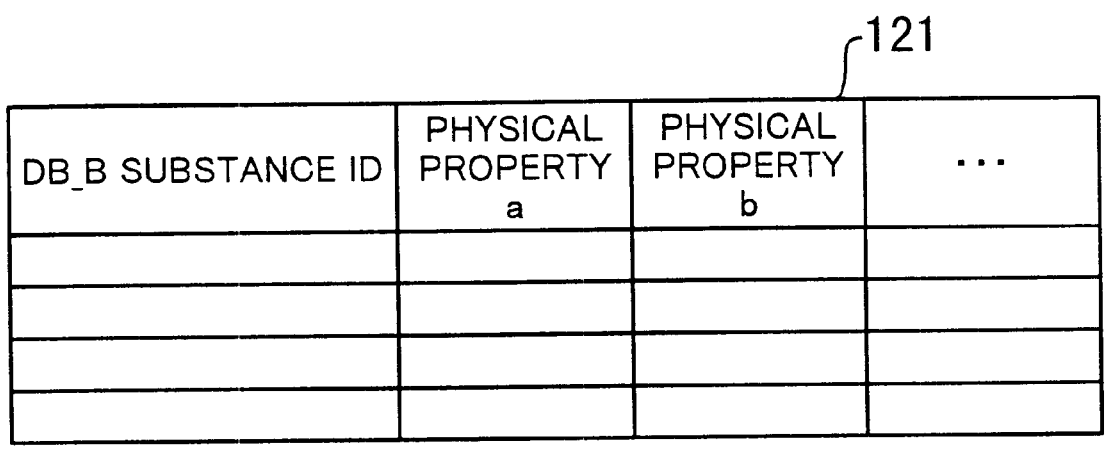
FIG. 5 is a diagram showing a data storage table 121.

FIG. 5 shows the data storage table 121. The data storage table 121 contains values of physical properties of substances, which are registered therein under respective items indicative of the physical properties ("physical property a," "physical property b," , , , ) in a manner correlated to substance IDs in the database DB_B. The substance IDs of the database DB_B are identifiers uniquely assigned to the respective substances, and enables the substances to be discriminated from each other only within the database DB_B 120. Thus, the data storage tables of these databases are separately organized, and therefore they have different substance IDs assigned to the same substances. Further, physical properties registered are also different from database to database. This is also the case with the other data storage tables 131 and 141.

Figure 6:
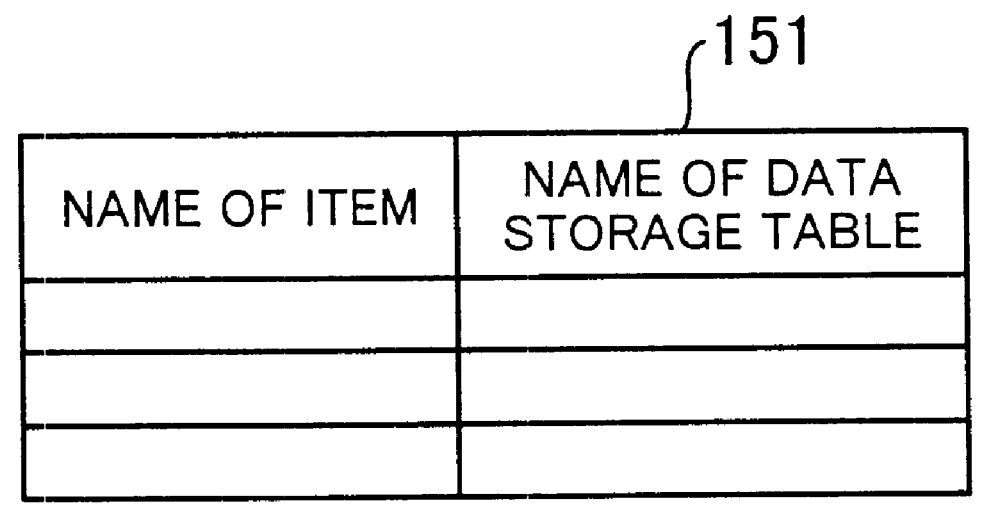

FIG. 6 shows an item-table lookup table 151. The item-table lookup table 151 contains items representative of physical properties of substances and names of data storage tables storing values of the physical properties of the substances. For instance, assuming that "electric conductivity" is entered as the name of an item, names of the databases (DBs) storing data of the electric conductivity are registered as the names of data storage tables.

By using the item-table lookup table 151, from the names of items contained in a query expression, databases containing information on the items can be selected whereby it is possible to search these databases alone to retrieve information therefrom.

Figure 7:
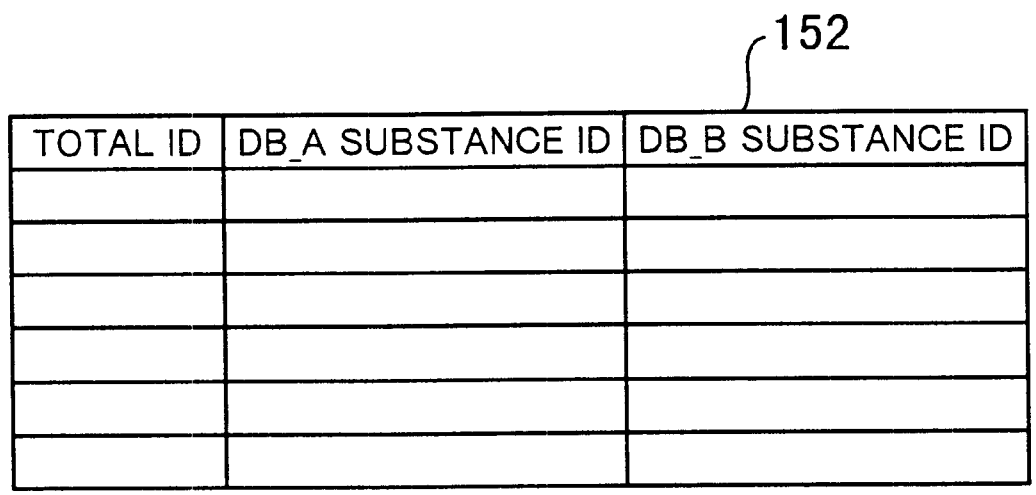
FIG. 7 is a diagram showing an inter-DB lookup table.

FIG. 7 shows an inter-DB substance lookup table 152. In the inter-DB substance lookup table 152, each of the substance Ids for database A (DB_A) are listed in the column entitled DB_A Substance ID. Substances in database B (DB_B) that correlate to each of the corresponding substances in DB_A are listed in the column entitled DB_B Substance ID immediately to the right of the corresponding DB_A substance. A total identifier correlating to each entry in the DB_A/DB_B Subtance ID columns is listed in the Total_ID column. This makes it possible to know what Id is assigned to a given substance in different databases.

Figure 8:
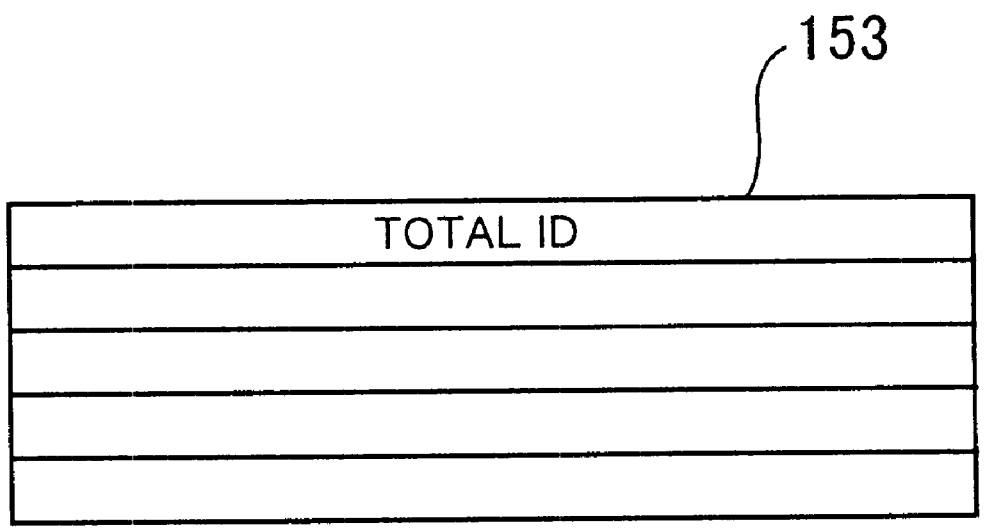
FIG. 8 is a diagram showing a primary storage table.

FIG. 8 shows a primary storage table 153. In the primary storage table 153, there are registered total identifiers (Total IDs) of substances which are retrieved by searching the databases in an integrating fashion by using a query expression input by the user.

Figure 9:
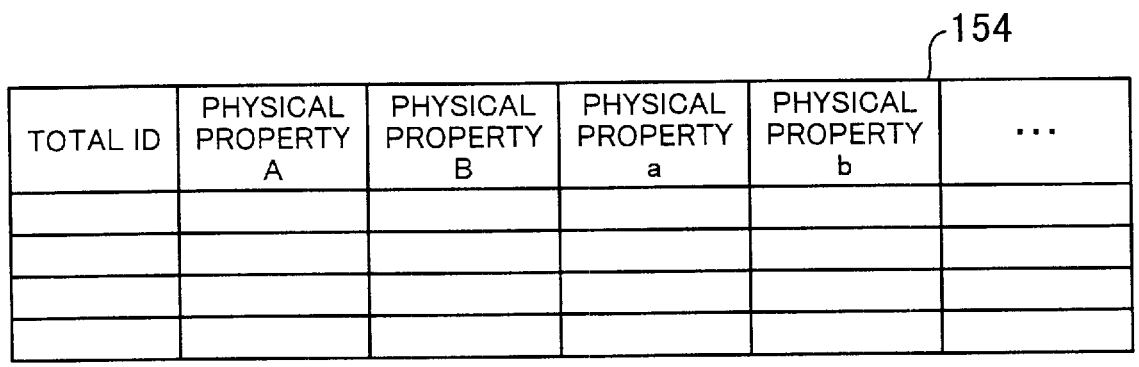
FIG. 9 is a diagram showing a secondary storage table.

FIG. 9 shows a secondary storage table 154. In the secondary storage table 154, there are registered values of physical properties corresponding to the total identifiers (Total IDs) registered in the primary storage table 153.

FIG. 10 shows a substance classification table 155. In the substance classification table 155, items or classes into which each substance designated by a total identifier (Total ID) is classified are checked.

Figure 11:
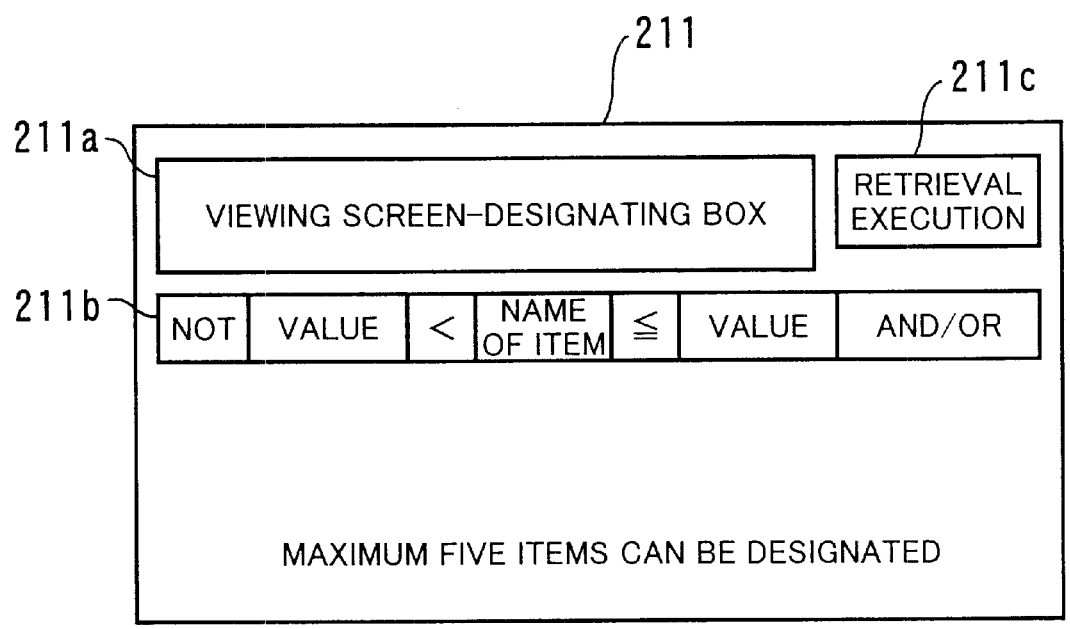
FIG. 11 is a diagram showing a retrieval condition-designating screen.

FIG. 11 shows a retrieval condition-designating screen 211. In the upper space of the retrieval condition-designating screen 211, there is provided a viewing screen-designating box 211a which is used in designating a screen for viewing results of a retrieval from a plurality of databases. In most cases, there is provided a menu for viewing the retrieved information from each of the databases 110, 120, 130, and 140 of FIG. 3 so as to enable selection of a suitable information view therefrom.

Below the viewing screen-designating box 211a, there is provided a query expression-entering area 211b. In the query expression-entering area 211b, an upper limit value and a lower limit value can be entered on opposite sides of the name of an item (a name of a physical property). Further, the logical operator of "NOT" (for retrieving substances which do not match the conditions defined) can be also designated. Further, when designating a plurality of conditions, the conditions may be joined by the logical operators AND (logical multiplication), OR (logical sum) or AND/OR. If AND/OR is designated, all conditions that would have been satisfied by the AND operator and all conditions that would have been satisfied by the OR operator are selected. In the illustrated example, a maximum of five search items or retrieval conditions can be entered.

At the upper right corner of this screen, there is provided a retrieval execution button 211c. By depressing the retrieval execution button 211c, the retrieval is carried out according to the query expression entered in the query expression-entering area 211b.

Figure 12:
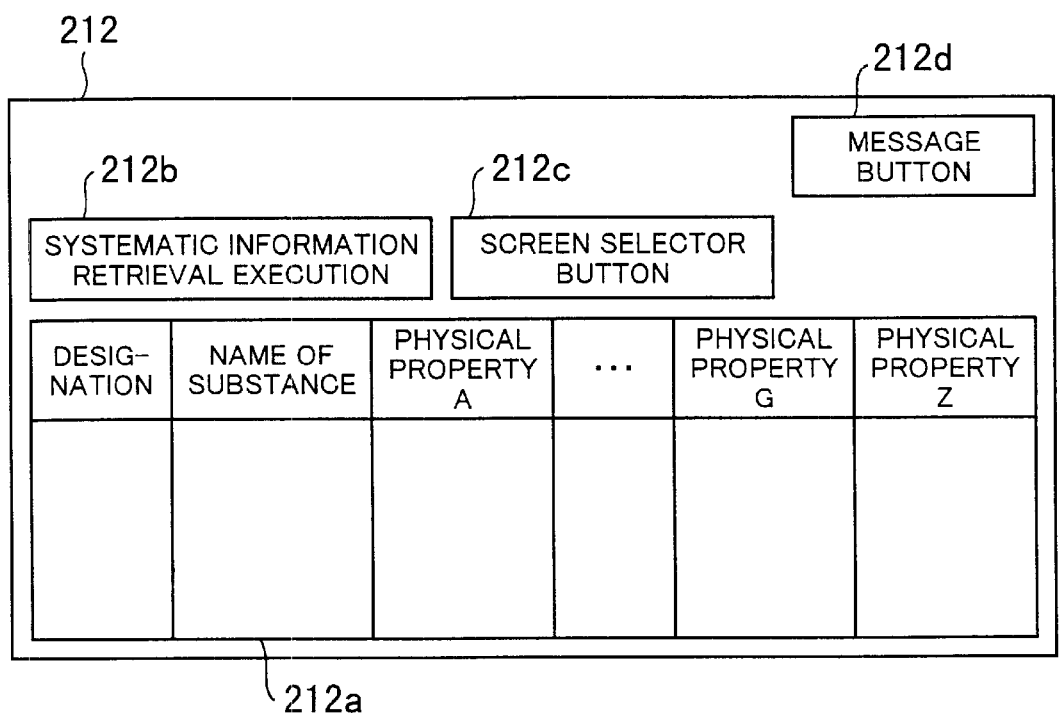
FIG. 12 is a diagram showing a retrieval result display screen.

FIG. 12 shows a retrieval result display screen 212. In the retrieval result display screen 212, there is provided a retrieval result display area 212a. The retrieval result display area 212a displays names of substances and values of physical properties of the displayed substances. The physical properties registered for each substance in the searched databases are collectively shown in this area 212a. From this area, it is possible to designate as to each substance whether or not the systematic information retrieval should be carried out.

A systematic information retrieval execution button 212b is a button which is depressed when the systematic information retrieval is to be carried out. When this button is depressed, substances which are systematically close to substances which are checked for the systematic information retrieval are additionally displayed in a retrieval result display area 212a. This enables the user to predict missing values of physical properties of the retrieved substances by displaying values of the physical properties of substances which are systematically close to the retrieved substances, for reference.

A screen selector button 212c is depressed for switching the screen over to another screen, e.g. a viewing screen provided for another retrieval function. A message button 212d is depressed for displaying messages from the database server 100.

The operation of the database retrieval system constructed above will be described hereinafter.

Figure 13:
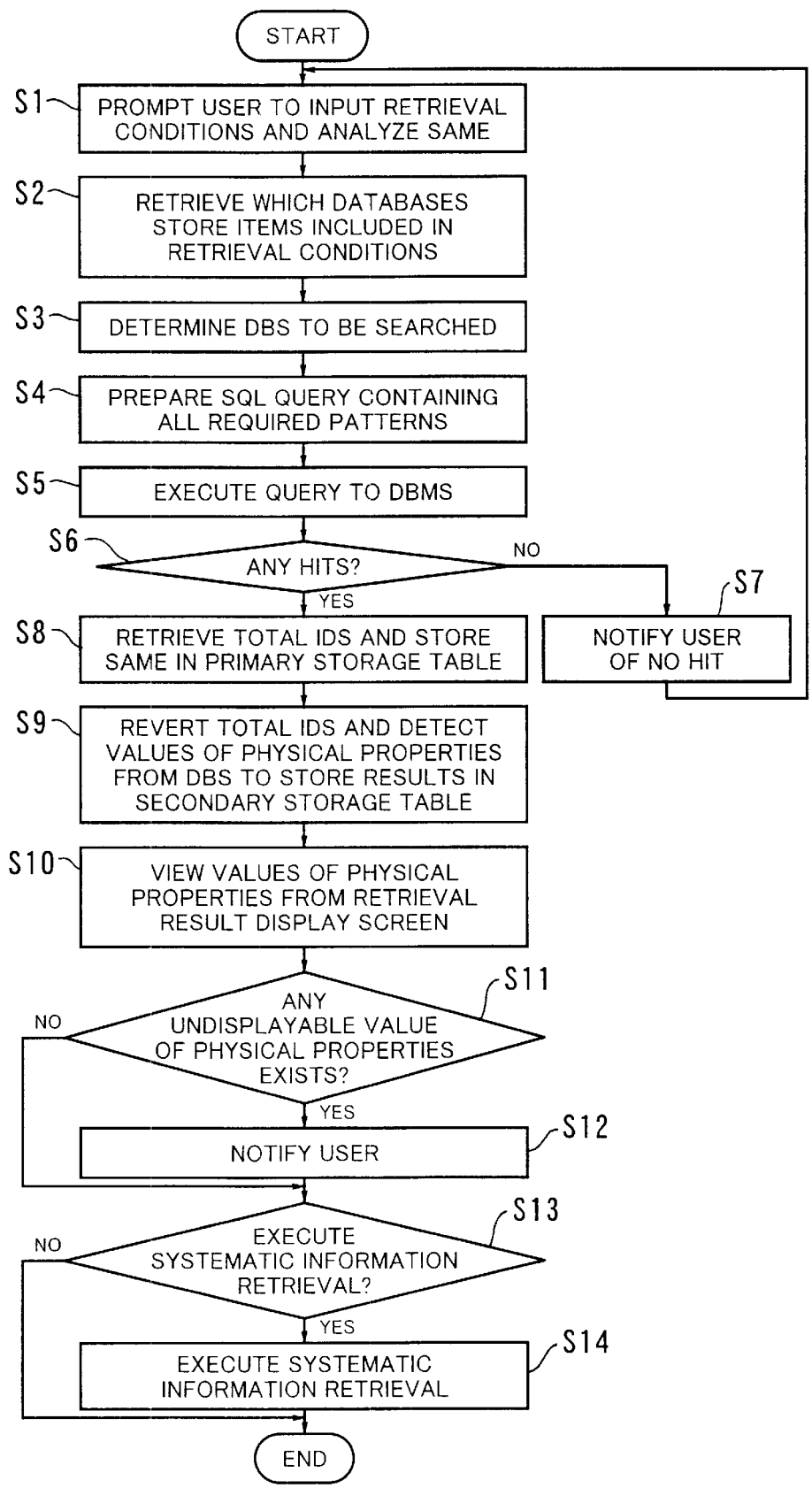
FIG. 13 is a flowchart showing an integrated information retrieval process.

FIG. 13 is a flowchart illustrating the process steps for carrying out the integrated information retrieval process. The integrated information retrieval process is started in the client 200 when a program therefore is started.

[S1] The user input/output control block 210 of the client 200 prompts the user to input retrieval conditions, and the database server 100 analyzes the input retrieval conditions. More specifically, the user input/output control block 210 displays the retrieval condition-designating screen 211 on the display device, and the user inputs a query expression to the query expression-entering area 211b from this screen. Then, the user depresses the retrieval execution button 211c. This sends the input query expression as the retrieval conditions to the database server 100. The database integrating block 150 of the database server 100 receives and analyzes the retrieval conditions to determine which databases to retrieve.

[S2] The database integrating block 150 retrieve which databases (hereinafter referred to as "DBs") contain information on items (physical properties) included in the retrieval conditions. More specifically, the database integrating block 150 looks up the item-table lookup table 151 to extract names of data storage tables correlated to the items included in the retrieval conditions.

[S3] The database integrating block 150 determines DBs to be searched. More specifically, the DBs storing the data storage tables extracted at the step S2 are determined to be the DBs to be searched.

[S4] The database integrating block 150 interacts with the SQL-generating block 102 to prepare a query in a structured query language (SQL) to be sent to the DBMS 101. The query is formed such that it contains all patterns suitable for the respective DBs to be searched.

[S5] The DBMS 101 executes the query. In this case, the information is retrieved according to the query from the DBs in their integrated state. The DBMS 101 returns query results.

[S6] The database integrating block 150 determines whether there is any retrieved information. If there is retrieved information, the program proceeds to step S8, whereas if there is no retrieved information, the program proceeds to step S7.

[S7] The database integrating block 150 notifies the user that the query result does not contain any hit, followed by returning to the step S1. More specifically, the database integrating block 150 sends a predetermined message to the client 200, and the user input/output control block 210 displays the message on the screen of the display device.

[S8] The database integrating block 150 retrieves a total identifier (Total ID) of the retrieved substance, and stores the identifier (Total ID) in the primary storage table 153. More specifically, the substance IDs returned from the DBs are converted to total identifiers (Total IDs) by looking up the inter-DB substance lookup table 152. Then, the total identifiers (Total IDs) thus obtained are stored in the primary storage table 153.

[S9] The database integrating block 150 retrieves values of physical properties of the substances from the DBs, and stores the retrieved values in the secondary storage table 154.

[S10] The user views the retrieved values of the physical properties of the substances displayed on the retrieval result display screen 212. More specifically, the database integrating block 150 sends contents or values stored in the secondary storage table 154 together with the names of the substances represented by the total identifiers (Total IDs) to the client 200. The user input/output control block 210 opens the retrieval result display screen 212 and displays information sent from the database integrating block 150 on the retrieval result display area 212a. The user views the contents of the display.

[S11] The user input/output control block 210 determines whether or not there are any values of physical properties of the substances which cannot be viewed from the present retrieval result display screen 212. That is, each retrieval result display screen 212 is intended only for displaying results of the information retrieval from a corresponding one of the DBs, but displaying of physical properties which are not registered in the corresponding DB is necessarily excluded. Therefore, if there are any values of the physical properties which cannot be displayed on the present screen, the program proceeds to step S12, whereas if all the values of the physical properties are displayed, the program proceeds to step S13.

[S12] The user input/output control block 210 displays on the display device a message to the effect that the query result contains values of physical properties which cannot be displayed on the present retrieval result display screen 212. To view the values which cannot be displayed, it is required to designate a suitable viewing screen for a retrieval function adapted to another DB.

[S13] The user determines whether or not the systematic information retrieval function should be executed. If the systematic information retrieval function is to be executed, the program proceeds to step S14, whereas if the same is not to be executed, the present program is immediately terminated.

[S14] The database integrating block 150 carries out the systematic information retrieval function. The user input/output control block 210 displays results of the systematic information retrieval on the display device of the client 200, followed by terminating the program.

Figure 14:
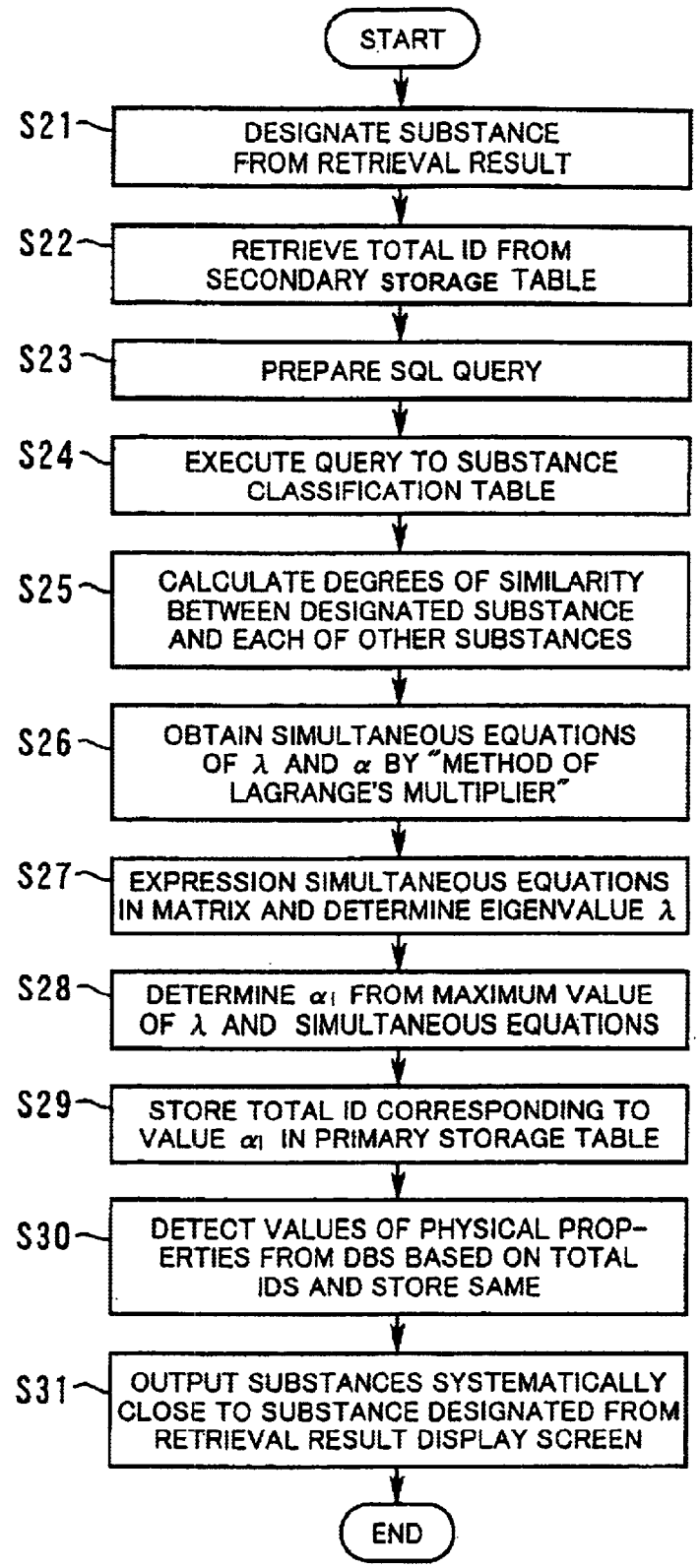
FIG. 14 is a flowchart showing a systematic information retrieval process.

FIG. 14 is a flowchart illustrating the process steps for carrying out the systematic information retrieval process.

[S21] From the retrieval result display screen 212, the user designates substances for which the systematic information retrieval should be carried out. More specifically, the check box of a desired one of the substances displayed on the retrieval result display screen 212 is checked for the systematic information retrieval. Then, the user depresses the systematic information retrieval execution button 212b. In response to the depression, the user input/output control block 210 sends a systematic information retrieval command to the database server 100.

[S22] The database integrating block 150 retrieves a total identifier (Total ID) of the substance designated for the systematic information retrieval by looking up the secondary storage table 154.

[S23] The database integrating block 150 cooperates with the SQL-generating block 102 to prepare an SQL query.

[S24] The database integrating block 150 retrieves information from the substance classification table 155 by passing the SQL query to the DBMS 101.

[S25] The database integrating block 150 calculates a degree of similarity between the designated substance and each of the other substances.

[S26] The database integrating block 150 obtains simultaneous equations of an eigenvalue λ and a value a representative of the similarity in terms of distance calculated by quantification of the similarity by applying the method of Lagrange's multipliers thereto.

[S27] The database integrating block 150 expresses the simultaneous equations obtained at the step S26 in a matrix, whereby the eigenvalue λ is determined.

[S28] The database integrating block 150 determines values $\alpha_i$ corresponding to the substances projected onto the coordinate axis from the maximum value of the eigenvalue λ and the simultaneous equations obtained at the step S26.

[S29] The database integrating block 150 stores the total identifier (Total ID) of a substance which has a value close to the value of the designated substance (closest or within a predetermined threshold value) among the values $\alpha_i$ on the coordinate axis, in the primary storage table 153.

[S30] The database integrating block 150 detects values of physical properties of the substance from the DBs by using the total identifier (Total ID) of the substance stored in the primary storage table 153, and stores the retrieved values in the secondary storage table 154.

[S31] The database integrating block 150 displays contents of the secondary storage table 154 together with the name of each substance represented by its Total ID to the client 200. The user input/output control block 210 additionally displays information received from the database integrating block 150 on the retrieval result display area 212a of the retrieval result display screen 212.

Thus the integrated retrieval and the systematic information retrieval are carried out. This gives the following advantageous effects:

The integration of DBs is advantageous in that it becomes possible to retrieve information of substances which cannot be retrieved by searches separately carried out on the respective DBs.

Figure 15:
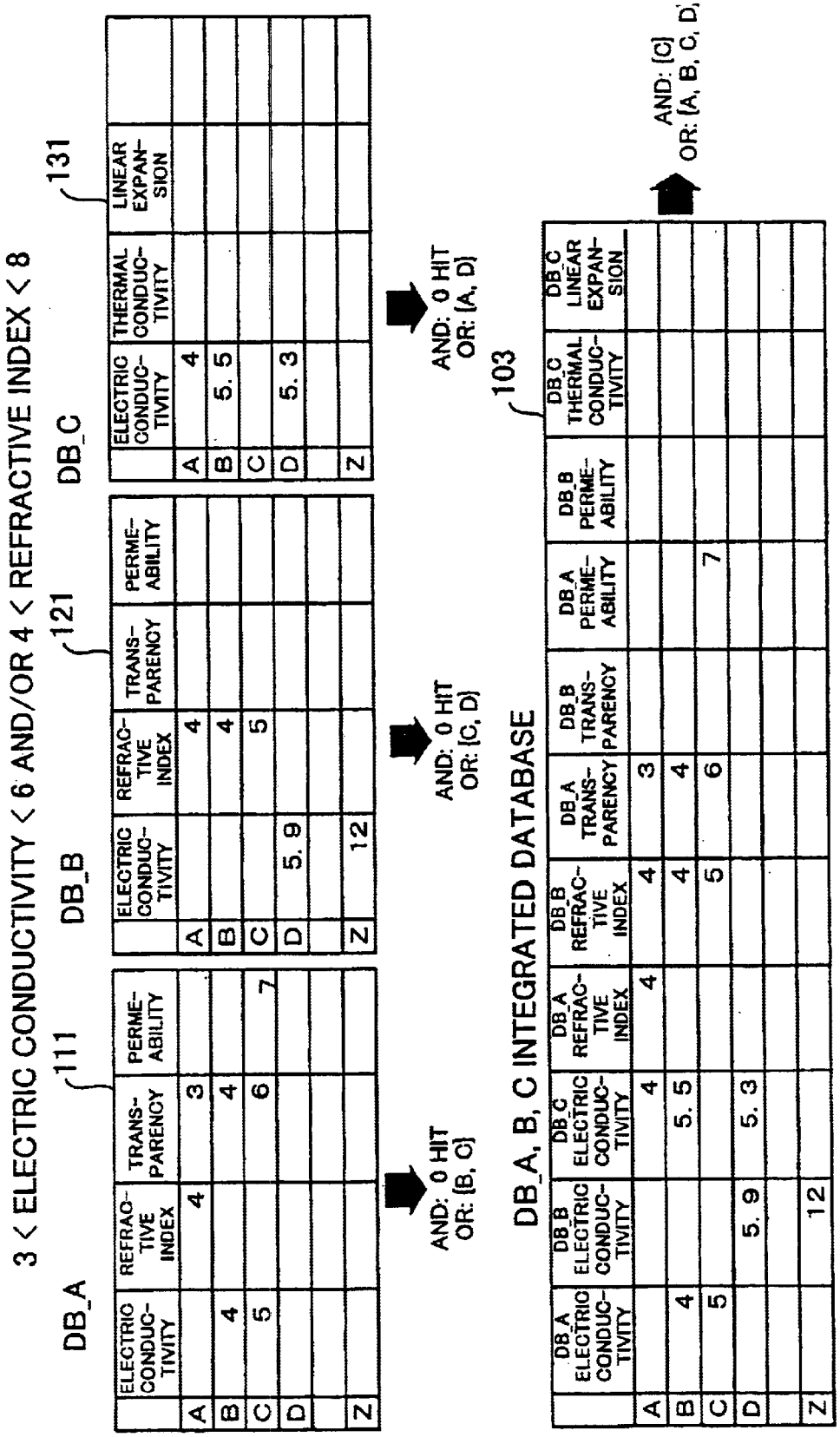
FIG. 15 is a diagram which is useful in explaining the advantages of integration of databases.

FIG. 15 is a diagram which is useful in explaining the advantageous effects obtained by integrated retrieval of the DBs. In the illustrated example, the data storage table 111 of the database "DB_A," the data storage table 121 of the database "DB_B," and the data storage table 131 of the database "DB_C" are integrated into a data storage table 103. In the data storage table 103 obtained by integrating the DBs, values of physical properties of substances registered in the DBs are organized as data in a single or integrated database. However, even if the data storage table 103 is not actually prepared within the database server, the integrated information retrieval from the DBs carried out in an DB-integrating fashion provides the same results as obtained when the information retrieval is carried out using the data storage table 103.

Let it be assumed that the retrieval is carried out using a query expression of "3<electric conductivity<6 AND/OR 4<refractive index<8." When this query expression is used in executing the information retrieval from DBs individually or separately, the database "DB_A" gives results of "AND: 0 hit, OR: {B, C}." Similarly, the database "DB_B" gives results of "AND: 0 hit, OR: {C, D}," and the database "DB_C" gives results of "AND: 0 hit, OR: {A, B, D}."

On the other hand, when the information retrieval using the same query expression is carried out using the data storage table 103 obtained by the integration of the DBs, results of "AND: {C}, OR: {A, B, C, D"} are obtained. That is, a result "AND: {C}" which could not be obtained by the separate or individual retrievals is additionally obtained.

Now, the advantageous effects of the integration of the DBs will be described using the names of specific substances.

FIG. 16 shows an example of results of retrievals separately carried out on the respective DBs. In the illustrated example, the data storage table 111a of the database "DB_A," the data storage table 112a of the database "DB_B," and the data storage table 113a of the database "DB_C" contain values of physical properties of various substances, such as "polyethylene terephthalate," "polyamide 6," "polybutylene terephthalate," "polypropylene," "methacrylate resin," etc.

The data storage table 111a contains values of physical properties of "specific gravity (small)," "tensile rupture (small)," "bending strength (small)" and "bending modulus (small)" registered therein.

The data storage table 112a contains values of physical properties of "specific gravity (small)," "tensile rupture (small)," "Izod impact strength (small)," "deflection temperature under load 18 k (large")" and "electric linkage temperature" registered therein.

The data storage table 113a contains values of physical properties of "specific gravity (small)," "tensile rupture (small)," "tensile rupture (large)," "breaking extension (small)" and "breaking extension (large)."

Now, let it be assumed that the retrieval is carried out by the retrieval conditions of "1.2<specific gravity (small)<1.7 AND/OR 950<tensile rupture (small)<1300." If this information retrieval is carried out on the DBs separately, the database "DB_A" gives results of "AND: 0 hit, OR: 1 hit {polyamide 6}." Similarly, the database "DB_B" gives results of "AND: 0 hit, OR: 1 hit{polybutylene terephthalate}," and the database "DB_C" gives results of "AND: 0 hit, OR: 2 hits {polyamide 6, polybutylene terephthalate}."

Such a retrieval cannot retrieve information of substances fulfilling the logical AND of the above retrieval conditions. Therefore, the following retrieval is carried out by integrating the DBs.

FIG. 17 shows an example of the information retrieval carried out by integrating the databases (DBs) storing data of physical properties of substances. In the data storage table 103a obtained by integrating the DBs, values of physical properties in the DBs are organized as data in a single database. Now, let it be assumed that the data storage table 103a is searched using the retrieval conditions as shown in FIG. 16. This search gives results of "AND: 2 hits {polyamide 6, polybutylene terephthalate}, OR: 2 hits {polyamide 6, polybutylene terephthalate}."

Thus, by integrating the DBs, information of the two substances fulfilling the logical AND of the above retrieval conditions can be retrieved.

It should be noted that in the present embodiment, when the integrated retrieval is carried out, only the databases containing items designated in the retrieval conditions are searched. Therefore, the integrated information retrieval process can be efficiently carried out.

The merit of the systematic information retrieval is that when a substance has an missing value (null value) of a physical property, reference can be made to a value of another substance similar in physical properties.

FIG. 18 is a first diagram which is useful in explaining the advantage of the systematic information retrieval. In the figure, there are shown sets of information generated at respective process steps by the present system.

[S101] As shown in the table, there are a lot of missing values in the integrated databases (DBs). However, the user cannot directly recognize the omission of these data. Therefore, the user cannot prepare a query expression which can overcome the inconvenience of omission of the data. So, now, let it be assumed that the user enters a query expression of "4<permittivity<12," and the information retrieval is carried out in response thereto.

[S102] Results of the information retrieval are displayed on the screen of the display device of the client 200. In the illustrated example, information of values of physical properties of the substances D, E and Z is obtained. However, even if the user desires to compare these substances fulfilling the above retrieval condition in respect of permittivity, the value of permittivity of the substance B is missing. Therefore, the systematic information retrieval is carried out for the substance B.

[S103] When a command for the systematic information retrieval is delivered, the database integrating block 150 projects substances in the order of systematic closeness therebetween onto a one-dimensional coordinate system, whereby a substance D is found which is systematically closest to the substance B.

[S104] Results of the systematic information retrieval are added to the results of the integrated information retrieval, and displayed on the screen of the display device of the client 200. By viewing the displayed results of the information retrieval, it is possible to predict the permittivity of the substance B from the value of permittivity of the substance D.

It should be noted that although in the above embodiment, only the systematically closest substance is extracted or retrieved, in some cases, the substance which is newly extracted by the systematic information retrieval does not have a value of the desired physical property, either. To eliminate the inconvenience, the systematic information retrieval can be carried out by designating required physical properties of which values are necessitated.

Figure 19:
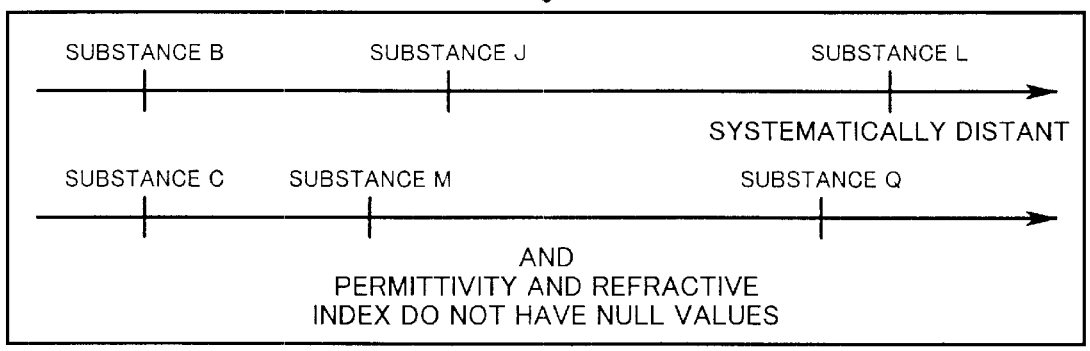
FIG. 19 is a second diagram which is useful in explaining the advantage of the systematic information retrieval.

FIG. 19 is a second diagram which is useful in explaining the advantage of the systematic information retrieval. In the figure, there are shown sets of information retrieved at respective process steps when the physical properties of which values are necessitated are designated in advance.

[S111] In the illustrated example, the DBs integrated are searched by using a query expression of "3<electric conductivity<6 OR 4<refractive index<5 OR 3<permeability<8."

[S112] As results of the integrated information retrieval, information of values of physical properties of the substances B and C is retrieved. However, even if the user desires to compare the retrieved substances in respect of the permittivity and refractive index, values of the permittivity and refractive index are missing in the retrieved information concerning the substances B and C. Therefore, the systematic information retrieval is carried out for the substances B and C. In doing this, a condition of "the value of permittivity and that of refractive index are not null" is joined to a query expression or command of the systematic information retrieval by the logical AND.

[S113] In response to the command of the systematic information retrieval, the database integrating block 150 projects the substances in the order of systematic closeness therebetween onto the one-dimensional coordinate system, whereby among the substances having a value of permittivity and a value of refractive index, substances J and M are found as closest to the substances B and C, respectively.

[S114] Results of the systematic information retrieval are added to the results of the integrated information retrieval and displayed on the screen of the display device of the client 200. From the displayed results of the retrievals, the values of permittivity and refractive index of the substances B and C can be predicted from those of the substances J and M.

Figure 20:
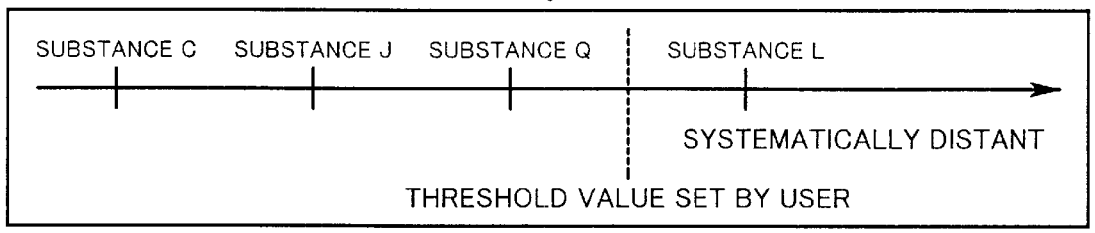
FIG. 20 is a third diagram which is useful in explaining the advantage of the systematic information retrieval.

It should be noted that although in the illustrated example, information of only one substance which is systematically closest to a substance having missing data is retrieved, this is not limitative, but the system may be configured such that the user can set a threshold value as desired to thereby retrieve information of all the substances having physical property values falling within the threshold value. One example will be given in the following:

FIG. 20 is a third diagram which is useful in explaining the advantage of the systematic information retrieval. In the figure, there are shown sets of information retrieved or generated at respective process steps carried out by the system.

[S121] In the illustrated example, the DBs integrated are searched by using a query expression of "3<permittivity <6 OR 4<refractive index<5 OR 3<permeability<8."

[S122] In the illustrated example, information of values of physical properties of the substances B and C is retrieved. Even if the user desires to know values of permittivity and refractive index of the substance C matching the above query expression, values of the permittivity and refractive index are missing in the retrieved data of the substance C. Therefore, the systematic information retrieval is carried out for the substance C. In doing this, a certain threshold value for determining required systematic closeness is added to a query expression or command thereof.

[S123] In response to the command of the systematic information retrieval, the database integrating block 150 projects the substances in the order of systematic closeness therebetween onto the one-dimensional coordinate system, whereby substances J and Q are found which are within the threshold values of closeness from the substance C.

[S124] Results of the systematic information retrieval are added to the results of the integrated information retrieval and displayed on the screen of the display device of the client 200. From the displayed results of the retrievals, the values of permittivity and refractive index of the substance C can be predicted from the values of these physical properties of the substances J and Q. In this case, values of predetermined physical properties of one substance can be predicted using values of the physical properties of a plurality of substances which are systematically close to the one substance, so that the difference between the expected value and the actual value of each required physical property can be minimized.

The above processing functions can be implemented by a computer. In such a case, details of the process which the database retrieval system is required to execute are written in a program recorded in a computer-readable storage medium. By executing the program, the computer realizes the processes described heretofore. The computer-readable storage medium includes a magnetic recording device, a semiconductor memory, etc. The program may be made available on the market by distributing portable recording media storing the program, such as CD-ROMs (Compact Disk Read Only Memories) and floppy disks, or by storing the program in a storage device of a computer connected to a network, and permitting the program to be transferred to other computers via the network. To execute the program by the computer, the program is stored in a hard disk drive or the like of the computer, and loaded into a main memory for execution.

As described above, in the database retrieval system according to the first aspect of the invention, data stored in a plurality of databases are integrated and an information retrieval is carried out using the integrated data. Therefore, it is possible to retrieve information from a plurality of databases by a similar procedure to the one taken when the information retrieval is carried out for a single database, which simplifies the retrieval operation. Further, since the information retrieval is carried out on the integrated data or information, it is possible to retrieve records which are left out of the retrieval when the information retrieval is carried out individually or separately.

Further, in the database retrieval system according to the second aspect of the invention, information is retrieved from other records which are systematically close to a designated record, so that when any of the retrieved records has missing data, the missing data can be predicted from the retrieved information of other records systematically close thereto.

Further the computer-readable storage medium according to the third aspect of the invention stores a program that integrates data of a plurality of databases and carries out information retrieval using the integrated data. Therefore, when the program is executed by a computer, the function of integrated information retrieval from a plurality of databases with simple operations can be realized on the computer.

Further, the computer-readable storage medium according to the fourth aspect of the invention stores a program that carries out information retrieval from other records which are systematically close to a designated record. Therefore, when the program is executed by a computer, if a retrieved record has missing data, data suitable for referrence in predicting the missing data can be displayed on the screen of the computer.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A database retrieval system retrieving information from databases storing various physical property data of substances, comprising:

a target database-extracting device to extract target databases to be searched for data in response to retrieval conditions input by a user; and an integrated information retrieval device coupled to said target database-extracting device, to integrate data of the substances in the target databases in response to the retrieval conditions input by the user, to select one of the substances in the integrated data responsive to a systematic information retrieval command, to classify the substances in the integrated data according to a plurality of classifying methods, to determine degrees of similarity between the substances in the integrated data based upon the classifying methods, to convert the degrees of similarity to degrees of closeness on a one dimensional coordinate system according to a multivariate analysis, and to retrieve from the integrated data substances with physical properties systematically close to the selected substance according to the degrees of closeness on the one-dimensional coordinate system.

2. A database retrieval system retrieving information from databases storing various physical property data of substances, comprising:

an integrated information retrieval device integrating physical property data of the substances from the databases, in response to a user input retrieval conditions; and a systematic information retrieval device, coupled to said integrated information retrieval device, and retrieving systematically close substances according to a process comprising:

responsive to a systematic information retrieval command, selecting one of the substances in the integrated physical property data, classifying the substances in the integrated physical property data according to a plurality of classifying methods, determining degrees of similarity between the substances in the integrated physical property data based upon the classifying methods, and converting the degrees of similarity to degrees of closeness on a one-dimensional coordinate system according to a multivariate analysis to retrieve from the integrated physical property data substances systematically close to the selected substance.

3. A database retrieval system according claim 2, further comprising an input/display device having a screen, producing a retrieval result display of substance records retrieved by said integrated information retrieval device on said screen, and receiving an input for selecting the specified record to be searched by said systematic information retrieval device, from the records displayed on said screen, and wherein said systematic information retrieval device retrieves the additional records which are systematically close to the specified record.

4. A database retrieval system according to claim 3, wherein said systematic information retrieval device retrieves additional substance records which are systematically closer to said selected substance record with respect to a threshold value designated in advance.

5. A database retrieval system according to claim 2, wherein said systematic information retrieval device is responsive to said systematic information retrieval command in which a property is designated, to retrieve other substance records which have said property and are systematically close to said selected substance record.

6. A database retrieval system retrieving information from databases storing various physical property data of substances, comprising:

a programmed computer processor as systematic information retrieval device controls the system according to a process comprising:

integrating physical property data of the substances from the databases, in response to a user input retrieval conditions, responsive to a systematic information retrieval command, designating one of the substances in the integrated physical property data, classifying the substances in the integrated physical property data according to a plurality of classifying methods, determining degrees of similarity between the substances in the integrated physical property data based upon the classifying methods, converting the degrees of similarity to degrees of closeness on a one-dimensional coordinate system according to a multivariate analysis, and retrieving from the integrated physical property data substances systematically close to the designated substance according to the degrees of closeness on the one-dimensional coordinate system.

7. A database retrieval system according to claim 6, wherein the programmed computer processor as said systematic information retrieval device retrieves additional substance records which are systematically closer to said designated substance record with respect to a threshold value designated in advance.

8. A database retrieval system according to claim 6, wherein the programmed computer processor as said systematic information retrieval device is responsive to said systematic information retrieval command in which a property is designated, to retrieve other substance records which have said property and are systematically close to said designated substance record.

9. A computer-readable storage medium storing a program controlling a processor to perform a method comprising:

integrating physical property data from databases storing various physical property data of substances, in response to input retrieval conditions;

responsive to a systematic information retrieval command, designating one of the substances in the integrated physical property data;

classifying the substances in the integrated physical property data according to a plurality of classifying methods;

determining degrees of similarity between the substances in the integrated physical property data based upon the classifying methods;

converting the degrees of similarity to degrees of closeness on a one-dimensional coordinate system according to a multivariate analysis; and retrieving from the integrated physical property data substance records with physical properties systematically close to the designated substance according to the degrees of closeness on the one-dimensional coordinate system.

10. A method of retrieving information from databases storing various physical property data of substances, comprising:

integrating the physical property data from the databases in response to input retrieval conditions;

responsive to a systematic information retrieval command, designating one of the substances in the integrated physical property data;

classifying the substances in the integrated physical property data according to a plurality of classifying methods;

determining degrees of similarity between the substances in the integrated physical property data based upon the classifying methods;

converting the degrees of similarity to degrees of closeness on a one-dimensional coordinate system according to a multivariate analysis; and retrieving from the integrated physical property data substance records systematically close to the designated substance according to the degrees of closeness on the one-dimensional coordinate system.

11. A method as recited in claim 10, wherein said classifying is based on a property of the substances.

* * * * *